(No Model.) 2 Sheets—Sheet 1.

W. G. SHEPHERD.
STEAM ENGINE VALVE.

No. 514,509. Patented Feb. 13, 1894.

WITNESSES
INVENTOR
William G. Shepherd
by Hallock & Hallock
Attorneys (No Model.) 2 Sheets—Sheet 2.
W. G. SHEPHERD.
STEAM ENGINE VALVE.

No. 514,509. Patented Feb. 13, 1894.

WITNESSES
INVENTOR
William G. Shepherd
by Hallock & Halleck
his Attorneys.

UNITED STATES PATENT OFFICE.

WILLIAM G. SHEPHERD, OF ERIE, PENNSYLVANIA.

STEAM-ENGINE VALVE.

SPECIFICATION forming part of Letters Patent No. 514,509, dated February 13, 1894.

Application filed March 20, 1893. Serial No. 466,927. (No model.)

*To all whom it may concern:*

Be it known that I, WILLIAM G. SHEPHERD, a citizen of the United States, residing at Erie, in the county of Erie and State of Pennsylvania, have invented certain new and useful Improvements in Steam-Engine Valves; and I do hereby declare the following to be a full, clear, and exact description of the invention, such as will enable others skilled in the art to which it appertains to make and use the same.

This invention relates to steam engine valves and consists in certain improvements in the construction thereof, as will be hereinafter fully described and pointed out in the claims.

More particularly my invention relates to steam engine valves of that class known as balance slide valves, and especially to flat surfaced balanced slide valves in contradistinction to those of the round or piston valve type. These valves usually run between parallel seats, and completely fill the space between them. Their construction is such as to neutralize within themselves the steam pressure upon the exposed parts of the valve, so that the pressure upon the seats is only such as is necessary to keep the valve tight. While the friction and consequent wear of this style of valve is reduced to a minimum, its construction is necessarily such that the least leakage will make the valve unbalanced; and as the least wear will produce leakage, it has been found desirable to provide some means to take up whatever wear there is, automatically.

To provide such means is the object of my invention.

My improvements are most advantageously applicable to double ported valves of this type, and in the accompanying drawings, I have illustrated them in such connection.

Figure 1:
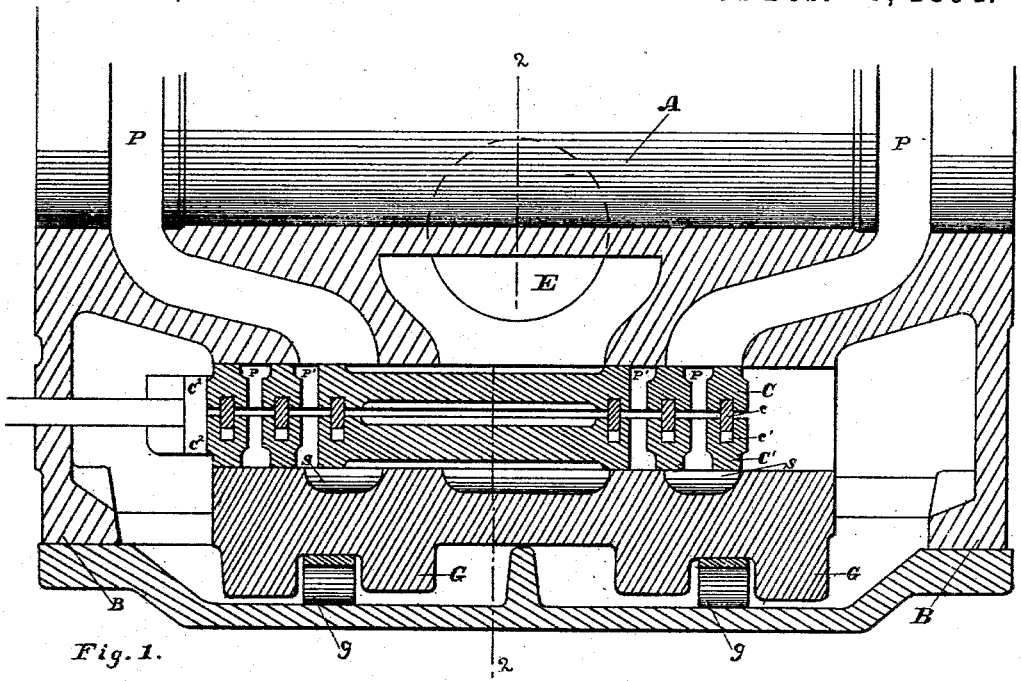
Figure 2:
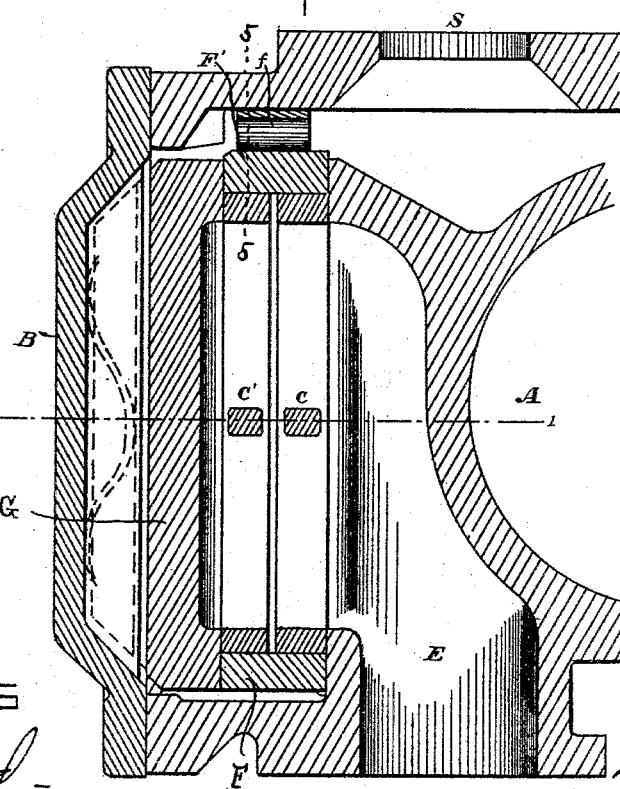
Figure 3:
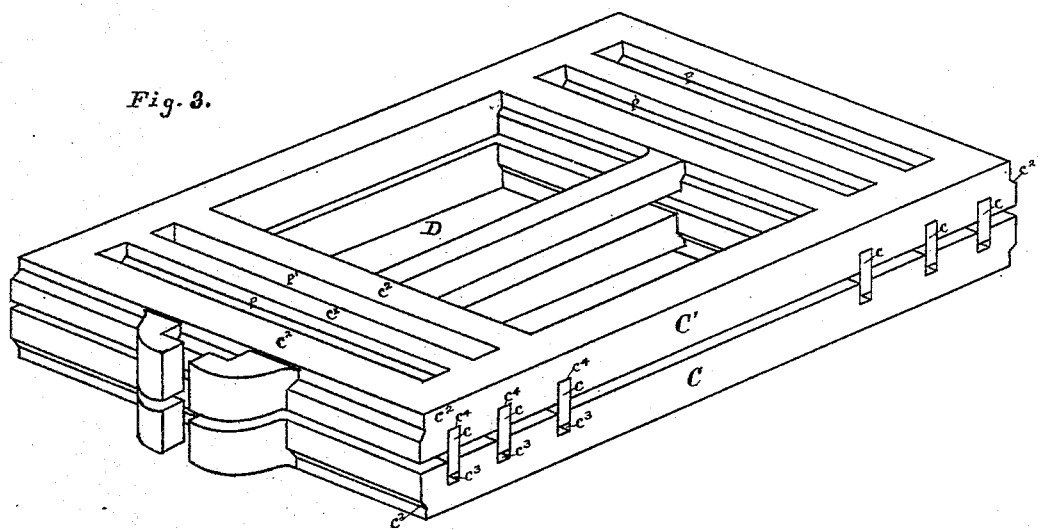
Figure 4:
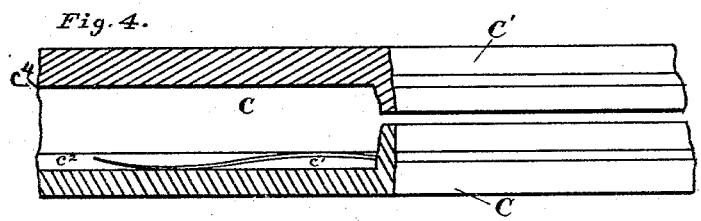
Figure 5:
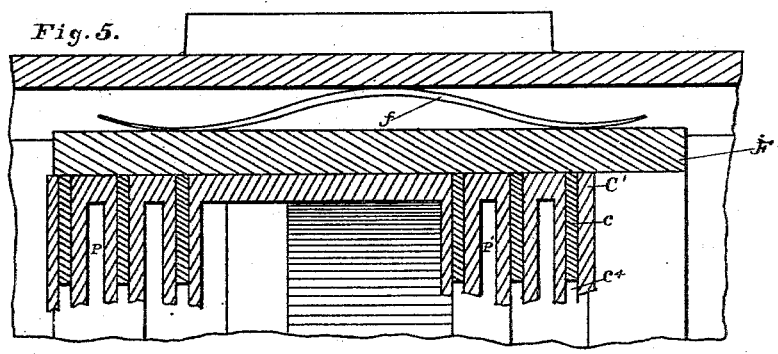

The accompanying drawings illustrate the invention as follows:

Figure 1 is a section through the longitudinal axis of the cylinder and steam chest on the line 1—1 in Fig. 2. Fig. 2 is a transverse section of the cylinder and steam chest on the line 2—2 in Fig. 1. Fig. 3 is a perspective view of the valve. Fig. 4 is an end elevation of the valve, a part being broken away, disclosing the packing strip, $c$, grooves $c^3$ and $c^4$ and spring, $c'$. Fig. 5 is a section of a fragment of the steam chest on the line 5—5 in Fig. 2.

A marks the cylinder; B, the steam chest; C, the valve; C', the relief plate on the valve; D, the usual "D" in the valve; G, the presser plate on which the relief plate is seated; F F', the distance plates at the sides of the valve; S, the passage for the admission of steam; E, the exhaust passage; and P P, the cylinder ports.

The valve to which I have adapted my invention is of the double port variety, the relief plate being of substantially the same shape as the valve, and acting upon its seat as an auxiliary valve by means of the passages $s$, in the presser plate and the valve ports, $p$ and $p'$. The steam passages of the valve are separated by the bridges, $c^2$, into which on the adjacent surfaces of the valve and relief plate are oppositely cut the grooves, $c^3$ and $c^4$, respectively. The packing strips, $c$, are fitted into these grooves so as to move readily therein, but still be steam tight, and are of such length as to come flush with the sides of the valve. The valve is held to its seats by the springs, $c'$, which are placed in the bottoms of the grooves, $c^3$ or $c^4$, and act opposingly upon the valve and relief plate through the packing strip, $c$. The steam entering between the valve and relief plate at their ends, unbalances them to that extent, and serves in connection with the springs, $c'$, to seat the valve. This action of the steam may be varied by the shape of the valve or plate, either, as shown in the drawings, by an offset, $C^2$, or by increasing the width of the grooves $c^3$ and $c^4$. Where, as is ordinarily, these valves are made of one piece, the only seats necessary are those of the presser plate and base of the steam chest. By making them in two parts, and allowing them to separate as they take up the wear, an opening is made through the sides, through which the steam would escape, if the ordinary construction of valve chamber were used. To obviate this, I provide the following means: One of the distance plates, F, is rigidly attached to the steam chest at the side of the valve, for which it forms a side seat. The other distance plate, F', is free to move laterally in the steam chest, and forms a side presser plate for the valve.

It is seated against the valve before the steam is admitted by the action of the spring, $f$. When the steam is admitted, it passes back of this plate and serves in connection with the spring in positioning the plate. The pressure of this plate upon the valve is sufficiently retarded, however, by the clamping action of the presser plate, G, upon it, to keep it from pinching and unbalancing the valve, as would otherwise result from this action of the steam upon it.

Flanges on the sides of one part of the valve may be substituted for the presser plate, F'; but I prefer the construction shown, as it is much cheaper to cut the grooves, $c^3$, entirely through the relief plate.

What I claim as new is—

1. In a steam engine, the combination of a double ported valve, having grooves, $c^3$, at the sides of its ports, a relief plate thereon, having oppositely placed grooves, $c^4$, therein and packing strips, $c$, in said grooves for the purposes set forth.

2. In a steam engine, the combination of a double ported valve having grooves, $c^3$, at the sides of its ports, a relief plate thereon having oppositely placed grooves, $c^4$, therein, packing strips, $c$, in said grooves and springs placed in said grooves that act opposingly on the valve and relief plate for the purposes set forth.

3. In a steam engine, the combination of the valve C, having double port passages, $p$ and $p'$, therein, relief plate, C', having like passages therein, bridges, $c^2$, at the sides of said passages having grooves, $c^3$ and $c^4$, oppositely placed therein on the adjacent surfaces of the valve and relief plate respectively, and packing strips, $c$, in said grooves.

4. In a steam engine, the combination of a valve having grooves, $c^3$, therein, a relief plate thereon having grooves, $c^4$, oppositely placed therein, packing strips $c$, in said grooves, side seat, F, and presser plate, F', for the purposes set forth.

5. In a steam engine, the combination of a valve having grooves, $c^3$, therein, a relief plate thereon having oppositely placed grooves, $c^4$, therein, packing strips, $c$, in said grooves, side seat and distance plate, F, presser and distance plate, F', and presser plate, G, that rides the plates, F and F', and clamps the presser plate, F', in position.

6. In a steam engine, the combination of a valve, C having double port passages, $p$ and $p'$, therein, relief plate, C', having like passages therein, bridges, $c^2$, at the sides of said passages having grooves, $c^3$ and $c^4$, oppositely placed therein on the adjacent surfaces of the valve and relief plate respectively, packing strips, $c$, in said grooves, side seat and distance plate, F, presser and distance plate, F', and presser plate, G, that rides the plates, F and F', clamps the presser plate, F, in position and has passages, $s$, therein.

In testimony whereof I affix my signature in presence of two witnesses.

WILLIAM G. SHEPHERD.

Witnesses:
L. E. TORRY,
H. C. LORD.